Jan. 11, 1966   A. C. WICKMAN   3,228,148
MANUFACTURE OF TOOTHED GEAR WHEELS
Filed Oct. 6, 1961
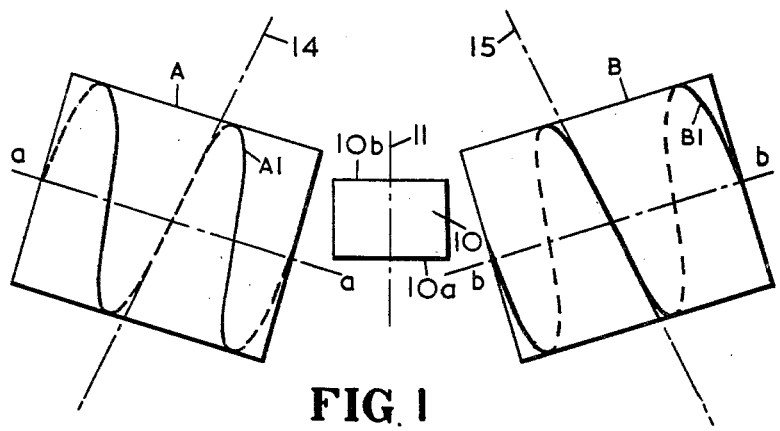
FIG. 1
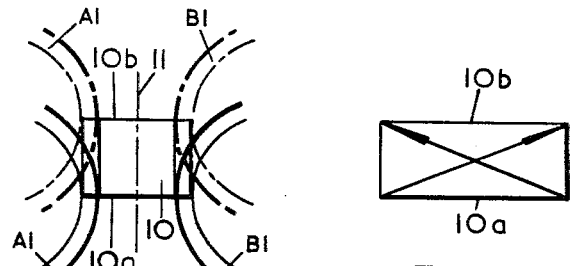
FIG. 3   FIG. 4
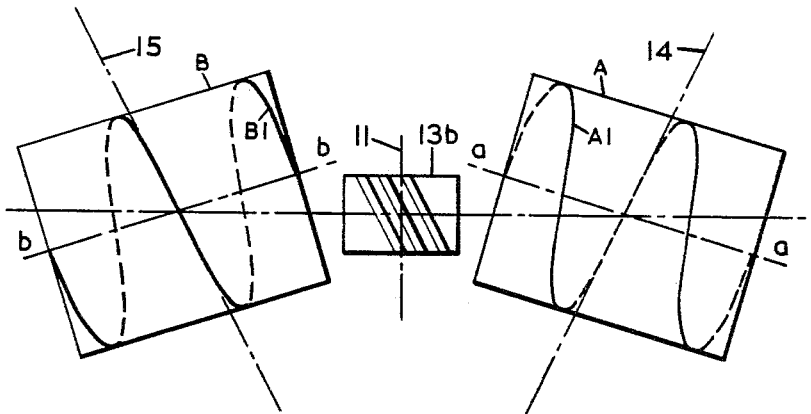
FIG. 2

Jan. 11, 1966  A. C. WICKMAN  3,228,148
MANUFACTURE OF TOOTHED GEAR WHEELS
Filed Oct. 6, 1961  7 Sheets-Sheet 7

INVENTOR:—
AXEL CHARLES WICKMAN
BY:— Mawhinney & Mawhinney
ATTORNEYS

United States Patent Office 3,228,148
Patented Jan. 11, 1966

3,228,148
MANUFACTURE OF TOOTHED GEAR WHEELS
Axel C. Wickman, 14 S. Hibiscus Drive, Hibiscus Island,
Miami Beach, Fla.
Filed Oct. 6, 1961, Ser. No. 143,501
16 Claims. (Cl. 51—80)

The invention relates to a method of, and apparatus for the manufacture of gear wheels, having equal cross-sections at the ends, and has for its object to produce them in a simple and expeditious manner.

The method of the invention broadly includes relatively feeding an appropriate blank, supported for rotation about its axis, in a direction which is at right-angles to its axis, between the peripheries of two spaced grinding wheels provided with helically-arranged tooth-forming grinding ribs, whereby the blank will be rotated about its axis and the whole of its periphery, from one axial end to the other, will be treated by the grinding ribs. It will be seen that the grinding wheels can, according to the pitch of the helix and to the direction of the feed path, grind axially-directed, or helically-directed teeth in the blank.

The grinding wheels will have helical grinding ribs of opposite hands if they are to be driven in the same sense, or the grinding wheels will have helical grinding ribs of the same hand if they are to be driven in opposite senses.

More specifically, the method includes arranging two grinding wheels, having helical tooth-forming grinding ribs of the same hand on their peripheries, in laterally-spaced relationship, and with their axes oppositely inclined in parallel planes, so as to provide a pass between the adjacent portions of their peripheries to accept an appropriate blank having its axis arranged transversely at equal and opposite angles to the axes of the grinding wheels, providing a feed movement in a direction at right-angles to the axis of the blank, and driving the grinding wheels in opposite senses, whereby the blank will rotate about its axis in the pass and the whole of its periphery, from one end of the blank to the other, will be treated by the grinding ribs of both grinding wheels. Again it will be seen that according to the helix angle, and the angles of inclination of the grinding wheel axes, either axially-directed, or helically-directed teeth can be ground in the blank.

According to a further feature the grinding wheels can be rectilinearly or curvilinearly waisted, and the blank can be complementarily curvilinearly barrelled so that the gear wheel produced is a barrelled one.

According to one method of providing the feed the grinding wheels are arranged side-by-side and are driven at unequal speeds so as to roll the blank from one end of the pass to the other, so that one grinding wheel will work progressively from one end of the blank to the other at one side of the pass and the other grinding wheel will work progressively from the said other end of the blank to the said one end thereof at the opposite side of the pass and the screwing action of the grinding ribs will rotate the blank about its axis during its traverse along the pass. In this method of providing the feed, however, it is arranged for both grinding wheels initially to be driven at the same speed while the blank is entered into the pass.

It can be arranged for the grinding ribs on the axial halves of the grinding wheels first encountered by the blank in being fed along the pass to the middle of the latter to be for grinding the teeth roughly, and for the grinding ribs on the other axial halves of the grinding wheels which act on the blank when being fed from the middle of the pass to the exist end to be for finish grinding the rough-ground teeth. For this purpose the said axial halves of the grinding wheels first encountered by the blank may be appropriately tapered.

According to an alternative method of providing the feed, the grinding wheels are arranged for the right-hand end of one of them to be just clear of the left-hand end of the other, with the blank laterally between these ends of the grinding wheels at the commencement of the grinding operation, and the grinding wheels are fed relatively to each other in a direction at right-angles to the axis of the blank whereby progressively to overlap and then pass each other to roll the blank between them, whereby both grinding wheels will work on the blank progressively from one end of the latter to the other but on opposite sides of the pass, and the relative feeding movement of the grinding wheels, in conjunction with the screwing action of their grinding ribs on the blank will rotate the latter about its axis during the traverse along the pass.

Apparatus, according to the invention, includes a pair of laterally-spaced grinding wheels with helical tooth-forming grinding ribs of the same hand on their peripheries, the grinding wheels being supported with their axes oppositely inclined in respective parallel planes and adapted to be driven in opposite senses, and means for causing a blank, having equal circular cross-sections at its ends and having its axis arranged transversely at equal and opposite angles to the grinding wheel axes, to move along the pass between the grinding wheels, the helix angles of the helical ribs, and the angles of inclination of the axes of the grinding wheels being such that the portions of the ribs which engage the blank during the feeding movement will rotate it about its axis for the whole of its periphery, from one end of the blank to the other, to be treated by the grinding ribs of both grinding wheels.

According to a still further feature, the blank can be rotatively supported from a shaft fast with a slide working in a guide parallel to the direction of the feed movement, and the grinding wheels be arranged side-by-side and driven at different speeds so as to provide the feed movement by the screwing action of the grinding ribs rolling the blank from one end of the pass to the other.

According to another feature, the blank can be rotatively supported from a stationary shaft, and the grinding wheels be slidably supported in parallel guides so that they can simultaneously be moved in opposite directions to provide the feed movement.

According to still another feature, the blank can be rotatively supported from a shaft fast with a slide working in a guide parallel to the direction of the feed movement, and one of the grinding wheels be slidably supported in a parallel guide so that sliding of the said one grinding wheel will roll the blank, and move the shaft along the pass to provide the feed movement.

Each grinding wheel can either have a single helically-arranged tooth-forming rib on its periphery, or it could be provided with two or more of them arranged in the manner of a multi-start screw thread, particularly when grinding axially-directed teeth.

In the accompanying drawings:

FIGURE 1 is a diagram illustrating the method of grinding helical gear teeth by using a pair of relatively displaceable grinding wheels, the parts being shown in the positions they occupy prior to the commencement of the operation;

FIGURE 2 is a diagram corresponding with FIGURE 1 but showing the parts in the positions they occupy at the end of the operation;

FIGURE 3 shows how the grinding wheels of FIGURES 1 and 2 grind the gear teeth in one direction from one axial end to the other of the blank, and FIGURE 4 is a diagrammatic graph further illustrating this point;

To facilitate a ready comprehension of the invention the grinding wheels are shown diagrammatically. Thus, it will be understood that although the grinding ribs are indicated by widely spaced helices the ribs, which are of multi-start form, would actually be spaced appropriately to the pitch of the teeth to be ground in the workpiece.

FIGURES 1 to 4 show two grinding wheels A and B which are respectively provided with helically-arranged, peripheral, tooth-forming grinding ribs A1 and B1 of the same hand. These grinding wheels are arranged with their respective axes $a$—$a$, $b$—$b$ equally and oppositely inclined with respect to the axis 11 of the blank 10 and lying in parallel planes at opposite sides of the latter. Thus, the axis $a$—$a$ lies in front of the blank in FIGURES 1 and 2, and the axis $b$—$b$ lies an equal distance behind the blank such that during the feeding movement, hereinafter described, the grinding wheels, in effect, move from the axially-separated condition shown in FIGURE 1, through a completely overlapping condition in which they engage opposite sides of the blank, to an oppositely axially-separated condition as shown in FIGURE 2.

It is here explained that the pitch of the grinding ribs has been grossly exaggerated, not only in FIGURE 1 but in the other figures, for ease of description, and that instead of a simple grinding rib use would preferably be made of a plurality of them arranged in the manner of the threads of a multi-start screw.

The two grinding wheels are driven at a relatively high speed in opposite senses during the feeding movement so that besides the rack-like action of the grinding wheels, the action of their grinding ribs also rotates the blank for the grinding of the teeth in the whole of its periphery.

It will be seen that at the commencement of the grinding operation the maximum penetration lines of the ribs of both grinding wheels attack the blank at its lower axial end 10a, and that during the feeding movement these lines move progressively up the blank to its upper axial end 10b. The maximum penetration lines therefore cross each other at a point half-way along the length of the blank as indicated by the diagrammatic graph of FIGURE 4. This is also shown in FIGURE 3 in which the active portions of the grinding ribs at the lower, entry ends of the grinding wheels are shown in full lines, and the active portions at the upper, exit ends of those wheels are shown in chain lines.

The directions of the active portions of the grinding ribs A1 and B1 are respectively indicated by the lines 14 and 15 in FIGURES 1 and 2, and an indication of the finished gear wheel is given at 13b in the latter figure.

Figure 12:
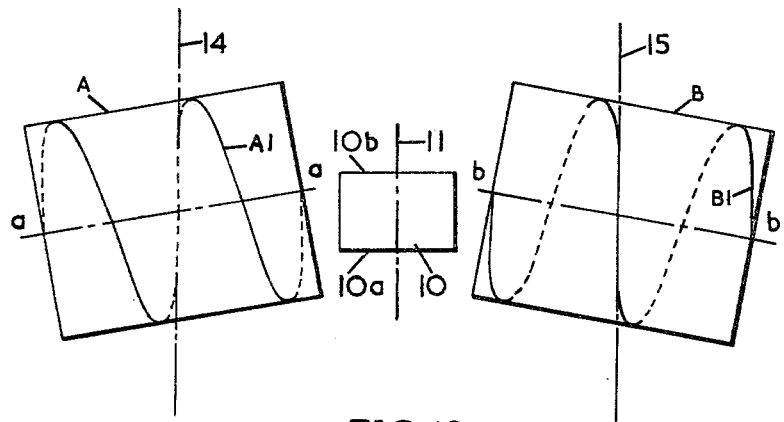
FIGURE 12 is similar to FIGURE 1, but shows the grinding of axially-directed teeth.

It will readily be seen from FIGURE 12 that if the angles of the axes $a$—$a$ and $b$—$b$, and the helix angles of the grinding ribs are such that the directions of the active portions of the grinding ribs are parallel to the axis 11 of the blank, the method could be applied for producing gear wheels with axially-directed teeth instead of the helically-toothed gear wheel 13b shown.

Figure 5:
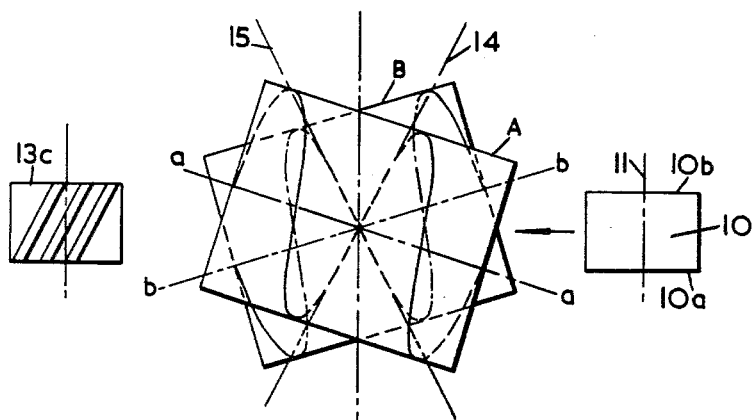
FIGURE 5 is a diagram illustrating the method of grinding helical gear teeth by using a pair of grinding wheels driven at different speeds.
Figures 6, 7:
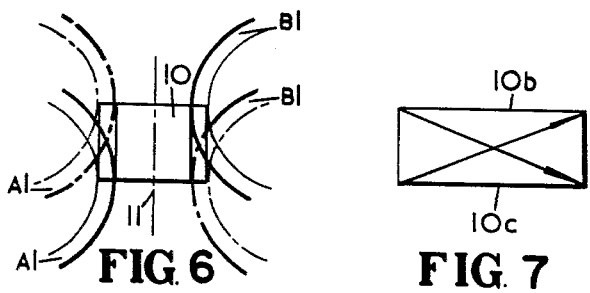
FIGURE 6 shows how the grinding wheels of FIGURE 5 grind the gear teeth from opposite axial ends of the blank.
FIGURE 7 is a diagrammatic graph further illustrating this point.

The method illustrated by FIGURES 5 to 7 differs from that illustrated by FIGURES 1 to 4 in that the two grinding wheels A, B are not moved relatively to each other in the endwise direction. Instead they are supported so as always to be in the fully overlapping position shown in FIGURE 5. They are, however, arranged with their axes $a$—$a$ and $b$—$b$ oppositely inclined in parallel planes as described with reference to FIGURE 1, and their respective helical tooth-forming ribs A1 and B1 are of the same hand. The grinding wheels are also driven in opposite senses, as before, but with the difference that they are driven at different speeds.

The blank, as before, passes, in the direction of the arrow, through the pass between the two grinding wheels, but in this case the blank, at the start of the feeding movement is attacked at the lower axial end by grinding wheel A, and at the upper axial end by grinding wheel B. When the blank will have arrived at the mid-point of the pass the maximum penetration lines of the two grinding wheels cross, and during the second half of the feeding movement proceed to the opposite ends of the blank from which they started. This is indicated in the diagrammatic graph of FIGURE 7, and also in FIGURE 6 where the ribs A1 and B1 are shown in full lines at the entry end of the pass, and in chain lines at the exit end. It will therefore be seen that each tooth is ground by one wheel up to the mid-point of the pass, and is re-ground by the other wheel from thence onwards. This offers the possibility of forming the axial halves of the grinding wheels at the entry end with grinding ribs which will form the gear teeth roughly, and the axial halves at their exit ends with grinding ribs for finish grinding the rough-ground gear teeth.

By driving the grinding wheels at different, relatively-high speeds the blank is rotated about its axis 11 by the differential screwing action of the two grinding ribs whereby to be fed from one end of the pass to the other. At the commencement of the feed movement, when the blank is just entering the pass, it is arranged for the grinding wheels to be driven at the same speed until their respective grinding ribs have sufficiently penetrated the surface of the blank to obtain a grip thereon. The speeds are then changed so as to provide the feed as above stated.

The differential speeds of the grinding wheels will obviously be chosen to suit the work in hand so that a desirable speed of feed movement along the pass shall be provided consistently with all of the teeth being properly ground for the full length of the blank.

Figure 13:
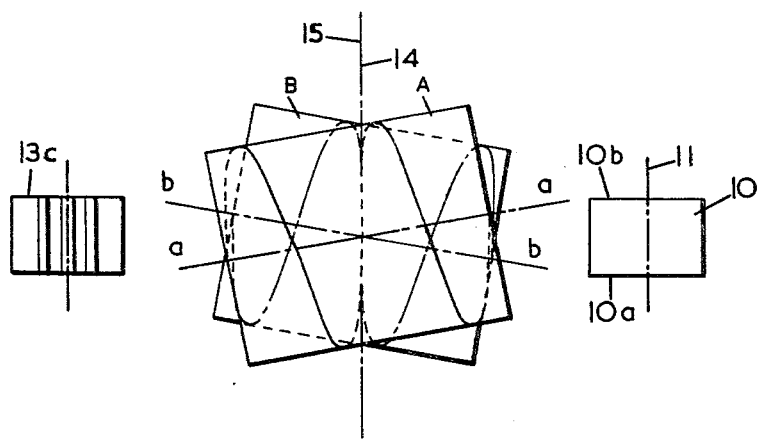
FIGURE 13 is similar to FIGURE 5, but shows the grinding of axially-directed teeth.

Again it will be seen that by choosing appropriate angles of inclination for the axes $a$—$a$ and $b$—$b$, and appropriate helix angles for the ribs A1 and B1 as shown in FIGURE 13, the lines 14 and 15 can be made parallel to the axis 11 of the blank for grinding axially-directed teeth therein.

Figure 8:
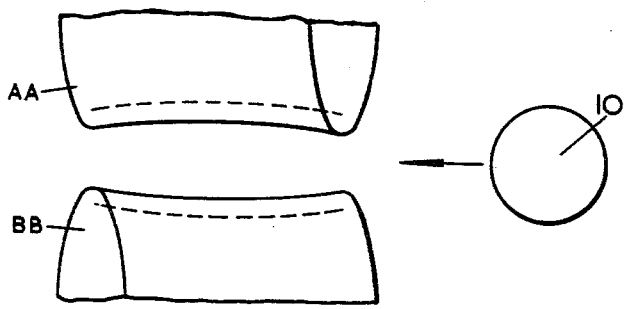
FIGURE 8 is a fragmentary diagram illustrating a modification of the method illustrated by FIGURE 5 whereby barrelled gear wheels can be produced.

By forming the grinding wheels AA and BB with concavely-dished peripheries as indicated by FIGURE 8, barrelled gear wheels, either with helical, or axially-directed teeth can be produced by the methods of the invention. It will also be understood that the same can be done if the grinding wheels are rectilinearly waisted instead of being curvilinearly waisted.

Figure 9:
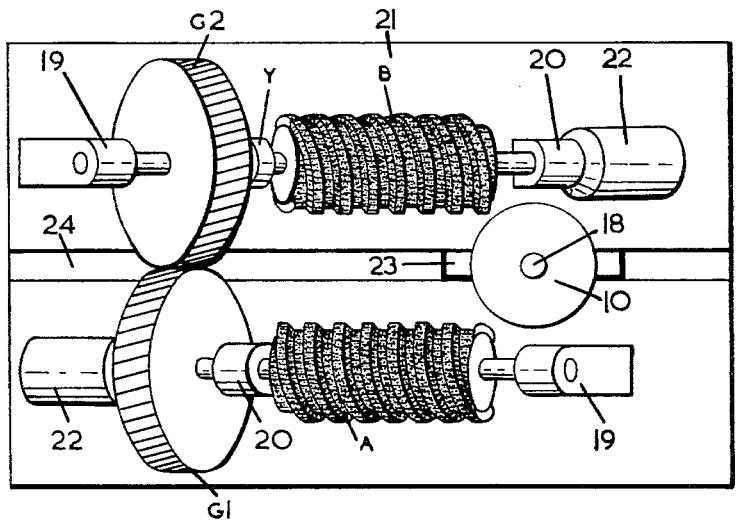
FIGURE 9 is a diagrammatic plan view of apparatus provided with a pair of grinding wheels for grinding the teeth of a gear wheel in accordance with the method described with reference to FIGURES 5 to 7.
Figure 10:
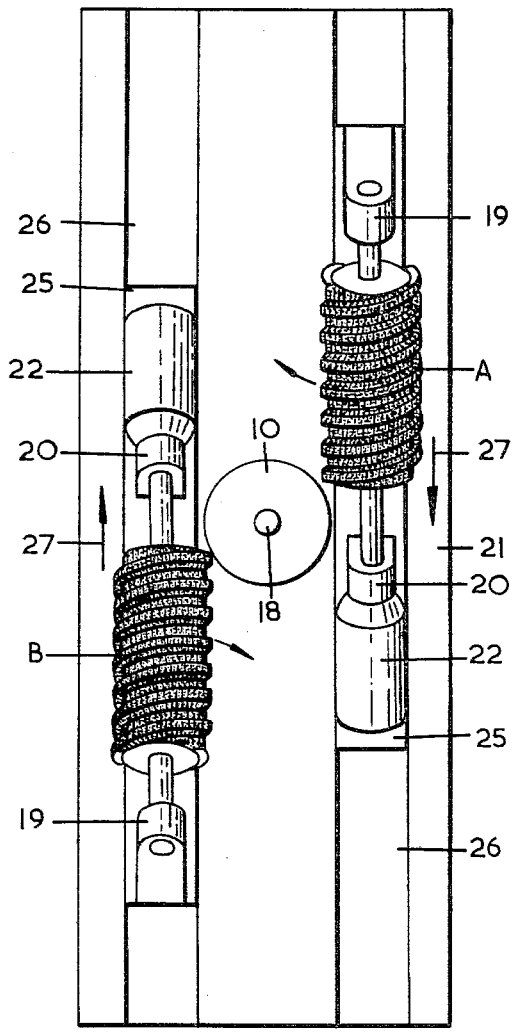
FIGURE 10 is a diagrammatic plan view of apparatus provided with a pair of grinding wheels for grinding the teeth of a gear wheel in accordance with the method described with reference to FIGURES 1 to 4.
Figure 11:
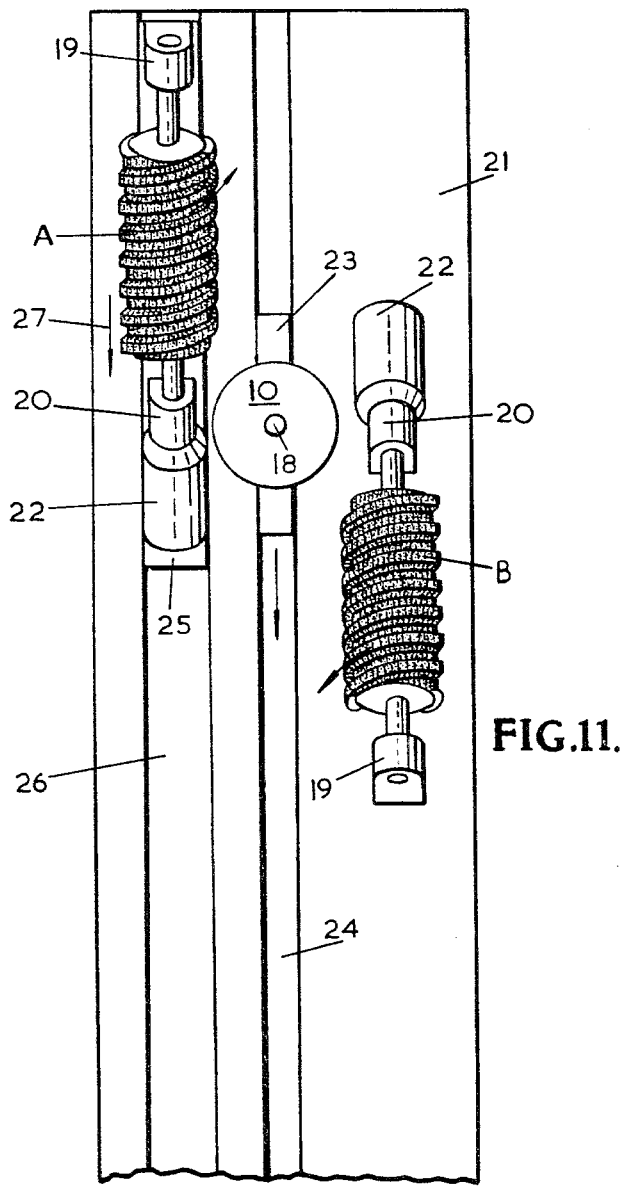
FIGURE 11 shows an alternative form of the apparatus of FIGURE 10.

The apparatus shown diagrammatically in FIGURES 9, 10 and 11 for performing the method of the invention all show a blank 10 journalled, with axial location, on a shaft 18.

In FIGURE 9, in which the apparatus is for performing the method according to FIGURES 5 to 7, the shaft 18 is fast with a slide 23 which works in a guide 24 of the base plate. The grinding wheels A and B are supported in bearings 19 and 20 and driven by separate electric motors 22. It is essential for the grinding ribs of the two grinding wheels to be in phase at the commencement of a tooth-grinding operation, and for this purpose the motor 22 of grinding wheel A initially drives grinding wheel B through a gear pair G1, G2 and a one-way driving clutch Y which will only communicate the drive to grinding wheel B when the grinding rib of that wheel is in phase with that of grinding wheel A. Thus, at the commencement of the operation, the two grinding wheels are driven into phase, and then at the same speed until their respective grinding ribs bite into the blank, whereafter the motor 22 of grinding wheel B is driven at a predetermined greater speed to provide the feed, clutch Y freewheeling in those conditions.

The apparatus shown diagrammatically in FIGURE 10 is for grinding the gear teeth according to the method described with reference to FIGURES 1 to 4. The shaft 18 in this case is fast with the bed plate and each of the grinding wheels A and B and its associated electric motor 22 is supported from a slide 25 working in a guide 26 in the bed plate. At the commencement of the operation the parts are in the relative positions shown, whereafter both slides 25 are moved by any convenient means (e.g., by lead screws) at the same speed in the opposite directions indicated by the arrows 27, until the grinding wheels have passed each other and moved out of engagement with the finished gear wheel.

FIGURE 11 shows a variant of the arrangement of FIGURE 10. One of the grinding wheels has its bearings 19 and 20, and its electric motor 22 fast with the bed plate, and the shaft 18 is supported from a slide 23 working in a guide 24. By moving the other grinding wheel, which is supported from a slide 25 working in a guide 26, the blank would be rolled between the two grinding wheels by a rack-like effect of the grinding wheels.

Figure 14:
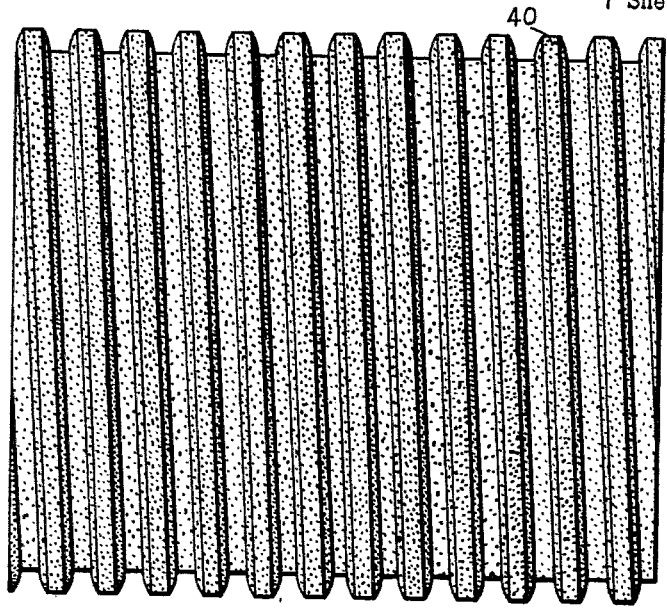
FIGURE 14 is an elevation of a grinding wheel having a single helical tooth-forming grinding rib.
Figure 15:
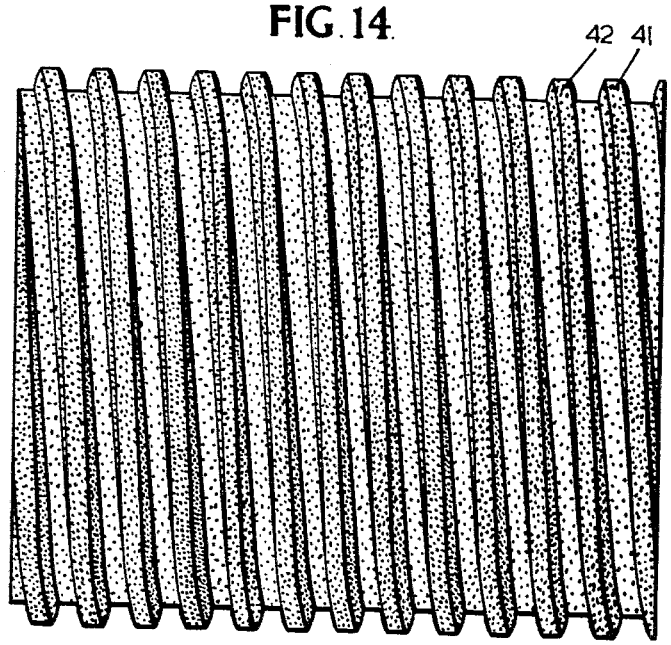
FIGURE 15 is an elevation of a grinding wheel having two helical tooth-forming grinding ribs.

It is emphasised that the proportional sizes of the grinding wheels and blank have not been shown realistically in the drawings owing to the necessity for showing small parts clearly. In practice the grinding wheels would have much greater diameters than those shown, possibly about 10 times the diameter of the blank, and the axial lengths of the grinding wheels would be of the order of the diameter of the blank; although it would be possible to increase the axial lengths of the grinding wheels so that two or more blanks, placed side-by-side, could be treated simultaneously. The drawings must, therefore, be considered as being mainly illustrative. However, FIGURES 14 and 15 indicate two forms of grinding wheel that would be suitable. FIGURE 14 has a single helical tooth-forming rib 40 whereas FIGURE 15 has two helical tooth-forming ribs 41 and 42. The provisions of the grinding ribs 40, 41 and 42 and the relative proportions of the grinding wheels shown in FIGURES 14 and 15 can of course be varied to suit individual requirements.

What I claim as my invention and desire to secure by Letters Patent of the United States is:

1. The method of manufacturing a toothed gear wheel having equal circular cross-sections at its ends, comprising arranging two grinding wheels, having helical tooth-forming grinding ribs of opposite hands on their peripheries, in laterally-spaced relationship, and with their axes oppositely inclined in parallel planes, so as to provide a pass between the adjacent portions of their peripheries to accept an appropriate blank having its axis arranged transversely at opposite angles to the axes of the grinding wheels, providing a feed movement in a direction at right-angles to the axis of the blank, and driving the grinding wheels in the same sense, whereby the blank will rotate about its axis in the pass and the whole of its periphery from one axial end to the other will be treated by the grinding ribs of both grinding wheels.

2. The method of manufacturing a toothed gear wheel having equal circular cross-sections at its ends, comprising arranging two grinding wheels, having helical tooth-forming grinding ribs of the same hand on their peripheries, in laterally-spaced relationship, and with their axes oppositely inclined in parallel planes, so as to provide a pass between the adjacent portions of their peripheries to accept an appropriate blank having its axis arranged transversely at equal and opposite angles to the axes of the grinding wheels, providing a feed movement in a direction at right-angles to the axis of the blank, and driving the grinding wheels in opposite senses, whereby the blank will roate about its axis in the pass and the whole of its periphery from one axial end to the other will be treated by the grinding ribs of both grinding wheels.

3. The method of manufacturing a toothed gear wheel having equal circular cross-sections at its ends, comprising arranging two waisted grinding wheels, having helical tooth-forming grinding ribs of the same hand on their peripheries, in laterally-spaced relationship, and with their axes oppositely inclined in parallel planes, so as to provide a pass between the adjacent portions of their peripheries to accept a barrelled blank having its axis arranged transversely at equal and opposite angles to the axes of the grinding wheels, providing a feed movement in a direction at right-angles to the axis of the blank, and driving the grinding wheels in opposite senses, whereby the blank will rotate about its axis in the pass and the whole of its periphery from one axial end to the other will be treated by the grinding ribs of both grinding wheels.

4. The method according to claim 3 in which the grinding wheels are curvilinearly waisted.

5. The method according to claim 3 in which the grinding wheels are rectilinearly waisted.

6. The method of manufacturing a toothed gear wheel having equal circular cross-sections at its ends, comprising arranging two grinding wheels, having helical tooth-forming grinding ribs of the same hand on their peripheries, in laterally-spaced side-by-side relationship, and with their axes oppositely inclined in parallel planes, so as to provide a pass between the adjacent portions of their peripheries to accept an appropriate blank having its axis arranged transversely at equal and opposite angles to the axes of the grinding wheels, and driving the grinding wheels in opposite senses at unequal speeds so as to roll the blank from one end of the pass to the other, this rolling action in conjunction with the screwing action of the grinding ribs on the blank rotating the latter about its axis during its traverse along the pass.

7. The method according to claim 6 which involves using grinding wheels having grinding ribs on their axial halves first to be encountered by the blank in moving along the pass which are adapted to rough-grind the gear teeth, and having grinding ribs on their axial halves last to be encountered by the blank in moving along the pass which are adapted to finish-grind the roughly ground teeth.

8. The method of manufacturing a toothed gear wheel having a equal circular cross-sections at its ends, comprising arranging two grinding wheels, having helical tooth-forming grinding ribs of the same hand on their peripheries, end-to-end in laterally-spaced relationship, and with their axes oppositely inclined in parallel planes, so as to provide a pass between the adjacent portions of their peripheries to accept an appropriate blank having its axis arranged transversely at equal and opposite angles to the axes of the grinding wheels, and relatively moving the grinding wheels in a direction at right-angles to the axis of the blank whereby progressively to overlap and then pass each other to roll the blank between them, whereby both grinding wheels will work on the blank progressively from one end to the other but on opposite sides of the pass, and the relative feeding movement of the grinding wheels in conjunction with the screwing action of their grinding ribs on the blank will rotate the latter about its axis during the traverse along the pass.

9. Apparatus for manufacturing a gear wheel from a blank having equal circular cross-sections at its ends, comprising a pair of grinding wheels with helical tooth-forming grinding ribs of the same hand on their peripheries, means supporting said grinding wheels in laterally-spaced relationship with their axes oppositely inclined in parallel planes, means for driving said grinding wheels in opposite senses, means for rotatively supporting the blank with its axis arranged transversely at equal and opposite angles to the grinding wheel axes, and means providing a relative feed movement between said blank and said grinding wheels in a direction at right-angles to the axis of the blank, the helix angles of the helical ribs, and the angles of inclination of the axes of the grinding wheels being such that the portions of the ribs which engage the blank during the feeding movement will rotate it about its axis for the whole of its periphery from one end to the other to be treated by the grinding ribs of both grinding wheels.

10. Apparatus, according to claim 9, having means for providing the relative feed movement comprising a bed plate, means rotatively mounting the grinding wheels from said bed plate, said bed plate provided with a guide, a slide in said guide and adapted to be moved therealong, and a shaft on said slide on which said blank is journalled.

11. Apparatus for manufacturing a gear wheel from a blank having equal circular cross-sections at its ends, comprising a bed plate, a pair of grinding wheels with helical tooth-forming grinding ribs of the same hand on their peripheries, means supporting said grinding wheels from said bed plate in laterally-spaced relationship with their axes oppositely inclined in parallel planes, means for driving said grinding wheels at different speeds in opposite senses, a guide on said bed plate, a slide in said guide and movable therealong, and a shaft fast with said slide and rotatively supporting the blank with its axis arranged transversely at equal and opposite angles to the grinding wheel axes, the difference in speed of said grinding wheels causing said grinding ribs to feed said blank between said grinding wheels in a direction at right-angles to the axis of the blank, the helix angles of the helical ribs, and the angles of inclination of the axes of the grinding wheels being such that the portions of the ribs which engage the blank during the feeding movement will rotate it about its axis for the whole of its periphery from one end to the other to be treated by the grinding ribs of both grinding wheels.

12. Apparatus for manufacturing a gear wheel from a blank having equal circular cross-sections at its ends, comprising a bed plate, a pair of grinding wheels with helical tooth-forming grinding ribs of the same hand on their peripheries, a pair of parallel guides on said bed plate, a respective slide in each said guide and movable therealong, said grinding wheels respectively supported from said slides in laterally-spaced relationship with their axes oppositely inclined in parallel planes, means for driving said grinding wheels in opposite senses, means for rotatively supporting the blank with its axis arranged transversely at equal and opposite angles to the grinding wheel axes, and means for moving said slides in a direction at right-angles to the axis of the blank, the helix angles of the helical ribs, and the angles of inclination of the axes of the grinding wheels being such that the portions of the ribs which engage the blank during the feeding movement will rotate it about its axis for the whole of its periphery from one end to the other to be treated by the grinding ribs of both grinding wheels.

13. Apparatus for manufacturing a gear wheel from a blank having equal circular cross-sections at its ends, comprising a bed plate, a pair of grinding wheels with helical tooth-forming grinding ribs of the same hand on their peripheries, a pair of parallel guides on said bed plate, a respective slide in each said guide and movable therealong, one of said grinding wheels supported from said bed plate and the other grinding wheel supported from one of said slides such that said grinding wheels are supported in laterally-spaced relationship with their axes oppositely inclined in parallel planes, means for driving said grinding wheels in opposite senses, a shaft fast with the other said slide for rotatively supporting the blank with its axis arranged transversely at equal and opposite angles to the grinding wheel axes, and means for moving the slide supporting the said one grinding wheel along its guide in a direction at right-angles to the axis of the blank so as to roll said blank between said grinding wheels as permitted by the movement of the slide supporting said shaft along its guide, the helix angles of the helical ribs, and the angles of inclination of the axes of the grinding wheels being such that the portions of the ribs which engage the blank during the feeding movement will rotate it about its axis for the whole of its periphery from one end to the other to be treated by the grinding ribs of both grinding wheels.

14. Apparatus for manufacturing a gear wheel from a blank having equal circular cross-sections at its ends, comprising a pair of grinding wheels with multiple helical tooth-forming grinding ribs of the same hand on their peripheries, means supporting said grinding wheels in laterally-spaced relationship with their axes oppositely inclined in parallel planes, means for driving said grinding wheels in opposite senses, means for rotatively supporting the blank with its axis arranged transversely at equal and opposite angles to the grinding wheel axes, and means providing a relative feed movement between said blank and said grinding wheels in a direction at right-angles to the axis of the blank, the helix angles of the helical ribs, and the angles of inclination of the axes of the grinding wheels being such that the portions of the ribs which engage the blank during the feeding movement will rotate it about its axis for the whole of its periphery from one end to the other to be treated by the grinding ribs of both grinding wheels.

15. The method of manufacturing a toothed gear wheel having equal circular cross-sections at its ends, comprising arranging two grinding wheels, having helical tooth-forming ribs on their peripheries, in laterally-spaced relationship, and with their axes oppositely inclined in parallel planes, so as to provide a pass between the adjacent portions of their peripheries to accept an appropriate blank having its axis arranged transversely at opposite angles to the axes of the grinding wheels, providing a feed movement in a direction at right-angles to the axis of the blank, and driving the grinding wheels whereby the grinding ribs of the grinding wheels will rotate the blank about its axis in the pass and the whole of the periphery of the blank, from one axial end to the other of the latter, will be treated by the grinding ribs of both grinding wheels.

16. Apparatus for manufacturing a gear wheel from a blank having equal circular cross-sections at its ends, comprising a pair of grinding wheels with helical tooth-forming grinding ribs on their peripheries, means supporting said grinding wheels in laterally-spaced relationship with their axes oppositely inclined in parallel planes, means for driving said grinding wheels, means for rotatively supporting the blank with its axis arranged transversely at equal and opposite angles to the grinding wheel axes, and means for providing a relative feed movement between said blank and said grinding wheels in a direction at right-angles to the axis of the blank, the helix angles of the helical ribs, and the angles of inclination of the axes of the grinding wheels being such that the portions of the ribs which engages the blank during the feeding movement will rotate it about its axis for the whole of its periphery from one end to the other to be treated by the grinding ribs of both grinding wheels.

References Cited by the Examiner
UNITED STATES PATENTS

| 1,698,953 | 1/1929 | Kavle et al. | 51—95 |
| 2,245,654 | 6/1941 | Drader et al. | 51—89 X |

LESTER M. SWINGLE, *Primary Examiner.*